Figure 1:
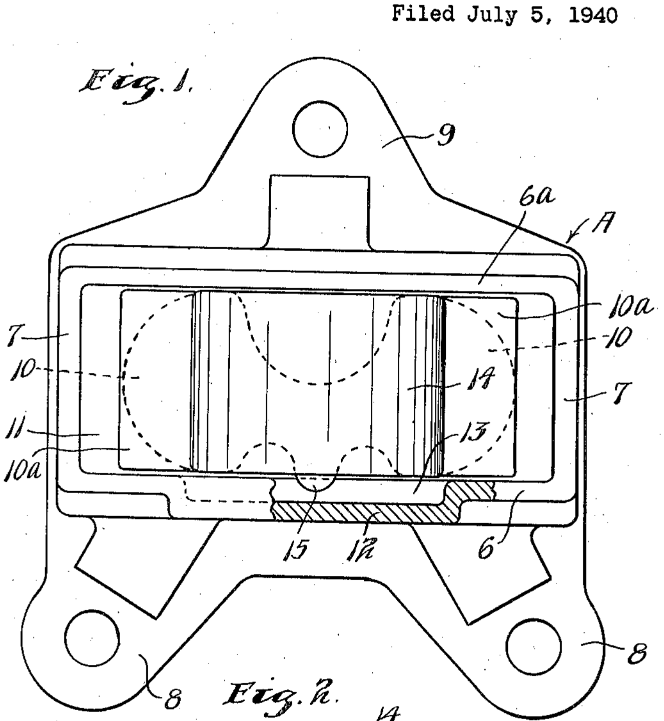
Figure 4:
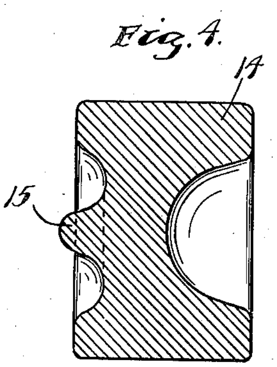
Figure 2:
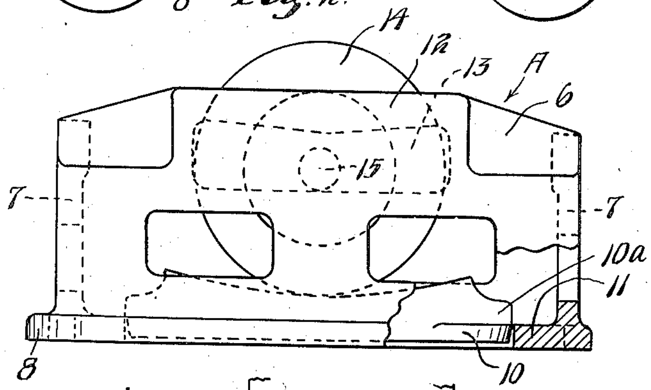
Figure 5:
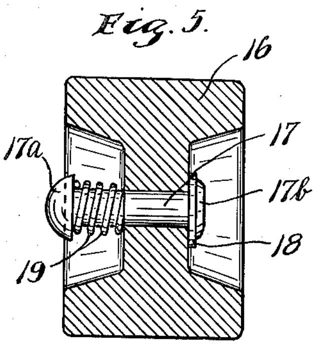
Figure 3:
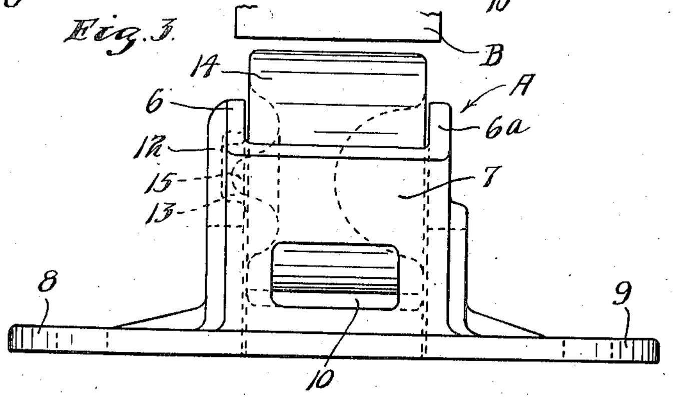

Aug. 12, 1941. E. W. WEBB 2,252,390

PROCESS FOR MAKING AND ASSEMBLING SIDE BEARINGS

Filed July 5, 1940

INVENTOR.
EDWIN W. WEBB.
BY HIS ATTORNEYS.
Williamson & Williamson

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

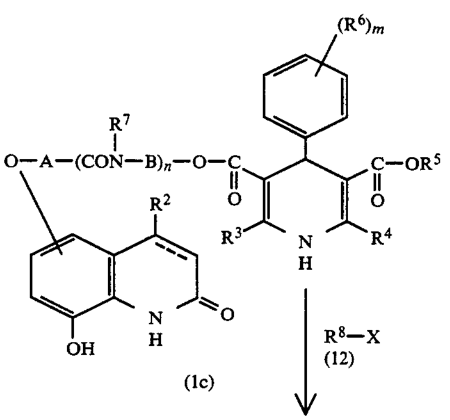

(1c)

$$v'_{ref}(t) = K\,r\,\delta\left(t - \frac{2L - 2d_s}{v_w}\right) + K(1 - r^2)e^{-2\alpha s d_s}$$

$$\cos\beta^* = \frac{K_2 - n\frac{T'}{v'}}{\sqrt{K_1^2 + \left(K_2 - n\frac{T'}{v'}\right)^2 + K_3^2}}$$

are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

$$(K_1x+K_2y+K_3z+T)+n(K''_1x+K'{}'_2y+K''_3z+T'')=0$$

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4$ = −0.15691 × $10^{-6}$ | $C_4$ = +0.95381 × $10^{-7}$ | $C_4$ = −0.22891 × $10^{-5}$ |
| $C_6$ = −0.40068 × $10^{-10}$ | $C_6$ = −0.73871 × $10^{-10}$ | $C_6$ = +0.12283 × $10^{-9}$ |
| $C_8$ = +0.21016 × $10^{-13}$ | $C_8$ = +0.12280 × $10^{-13}$ | $C_8$ = +0.84230 × $10^{-13}$ |
| $C_{10}$ = −0.37685 × $10^{-17}$ | $C_{10}$ = −0.33177 × $10^{-17}$ | $C_{10}$ = −0.20592 × $10^{-16}$ |

$f_1$ = 314.6
$f_2$ = 88.0
$f_3$ = −481.2
$f_4$ = −99.6

100mm

= 101.2 Aperture ratio: 1:1.10
agnification of projection: −7.997ˣ
alf angle of view: 28.56°

| | | | |
|---|---|---|---|
| 43.454 | $d_1$ = 11.0 | $n_1$ = 1.49380 | $L_1$ |
| -1542.254 | $d_2$ = 68 | | |
| 16.976 | $d_3$ = 20.0 | $n_2$ = 1.62286 | $L_2$ |
| 10.914 | $d_4$ = 2.87 | | |
| -89.375 | $d_5$ = 5.0 | $n_3$ = 1.59501 | $L_3$ |
| -127.071 | $d_6$ = 58.8 | | |
| -48.609 | $d_7$ = 5 | $n_4$ = 1.49380 | $L_4$ |
| ) | | | |
| ) | $d_8$ = 5 | $n_5$ = 1.45000 | S |
| ∞ | $d_9$ = 8 | $n_6$ = 1.51872 | G |

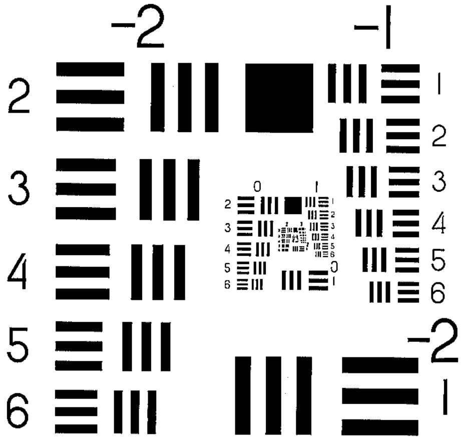

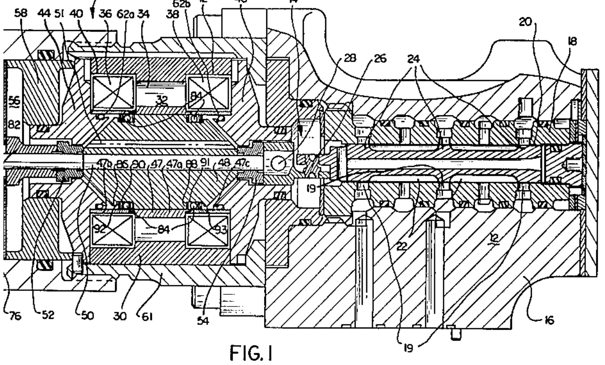

FIG. I

IMAGE SYSTEM
TEST TARGET
A

U.S. DEPARTMENT OF COMMERCE
PATENT AND TRADEMARK OFFICE

8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

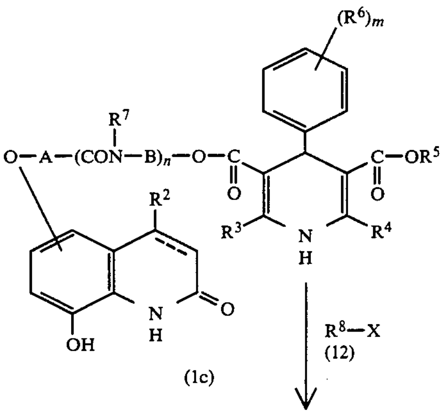

(1c)

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$\cos\beta^* = \frac{K_2 - n\frac{T'}{v''}}{\sqrt{K_1^2 + \left(K_2 - n\frac{T'}{v''}\right)^2 + K_3^2}}$$

$$v'_{refl}(t) = K\,r\,\delta\left(t - \frac{2L - 2d_s}{v_w}\right) + K\,(1 - r^2)e^{-2\alpha s d s}$$

$$(K_1x+K_2y+K_3z+T)+n(K''_1x+K''_2y+K''_3z+T'')=0$$

8 PT.

potensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4$ = −0.15691 × $10^{-6}$ | $C_4$ = +0.95381 × $10^{-7}$ | $C_4$ = −0.22891 × $10^{-5}$ |
| $C_6$ = −0.40068 × $10^{-10}$ | $C_6$ = −0.73871 × $10^{-10}$ | $C_6$ = +0.12283 × $10^{-9}$ |
| $C_8$ = +0.21016 × $10^{-13}$ | $C_8$ = +0.12280 × $10^{-13}$ | $C_8$ = +0.84230 × $10^{-13}$ |
| $C_{10}$ = −0.37685 × $10^{-17}$ | $C_{10}$ = −0.33177 × $10^{-17}$ | $C_{10}$ = −0.20592 × $10^{-16}$ |

$f_1$ = 314.6
$f_2$ = 88.0
$f_3$ = −481.2
$f_4$ = −99.6

100mm

| | | | |
|---|---|---|---|
| = 101.2 Aperture ratio: | | 1:1.10 | |
| lagnification of projection: | | −7.997$^x$ | |
| lalf angle of view: | | 28.56° | |
| 143.454 | $d_1$ = 11.0 | $n_1$ = 1.49380 | $L_1$ |
| −1542.254 | $d_2$ = 68 | | |
| 116.976 | $d_3$ = 20.0 | $n_2$ = 1.62286 | $L_2$ |
| 110.914 | $d_4$ = 2.87 | | |
| −89.375 | $d_5$ = 5.0 | $n_3$ = 1.59501 | $L_3$ |
| −127.071 | $d_6$ = 58.8 | | |
| −48.609 | $d_7$ = 5 | $n_4$ = 1.49380 | $L_4$ |
| ∞ | | | |
| ∞ | $d_8$ = 5 | $n_5$ = 1.45000 | S |
| ∞ | $d_9$ = 8 | $n_6$ = 1.51872 | G |

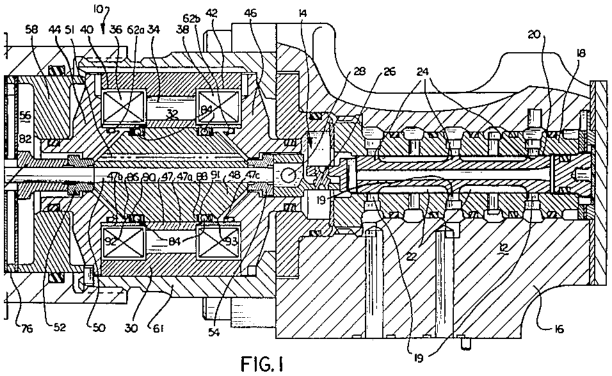

FIG. 1

U.S. DEPARTMENT OF COMMERCE ★ PATENT AND TRADEMARK OFFICE

IMAGE SYSTEM
TEST TARGET
A

U.S. DEPARTMENT OF COMMERCE
PATENT AND TRADEMARK OFFICE